D. MACLEAN.
COMPOUND HYDRO-STEAM ENGINE.
APPLICATION FILED SEPT. 8, 1910.
991,074.
Patented May 2, 1911.
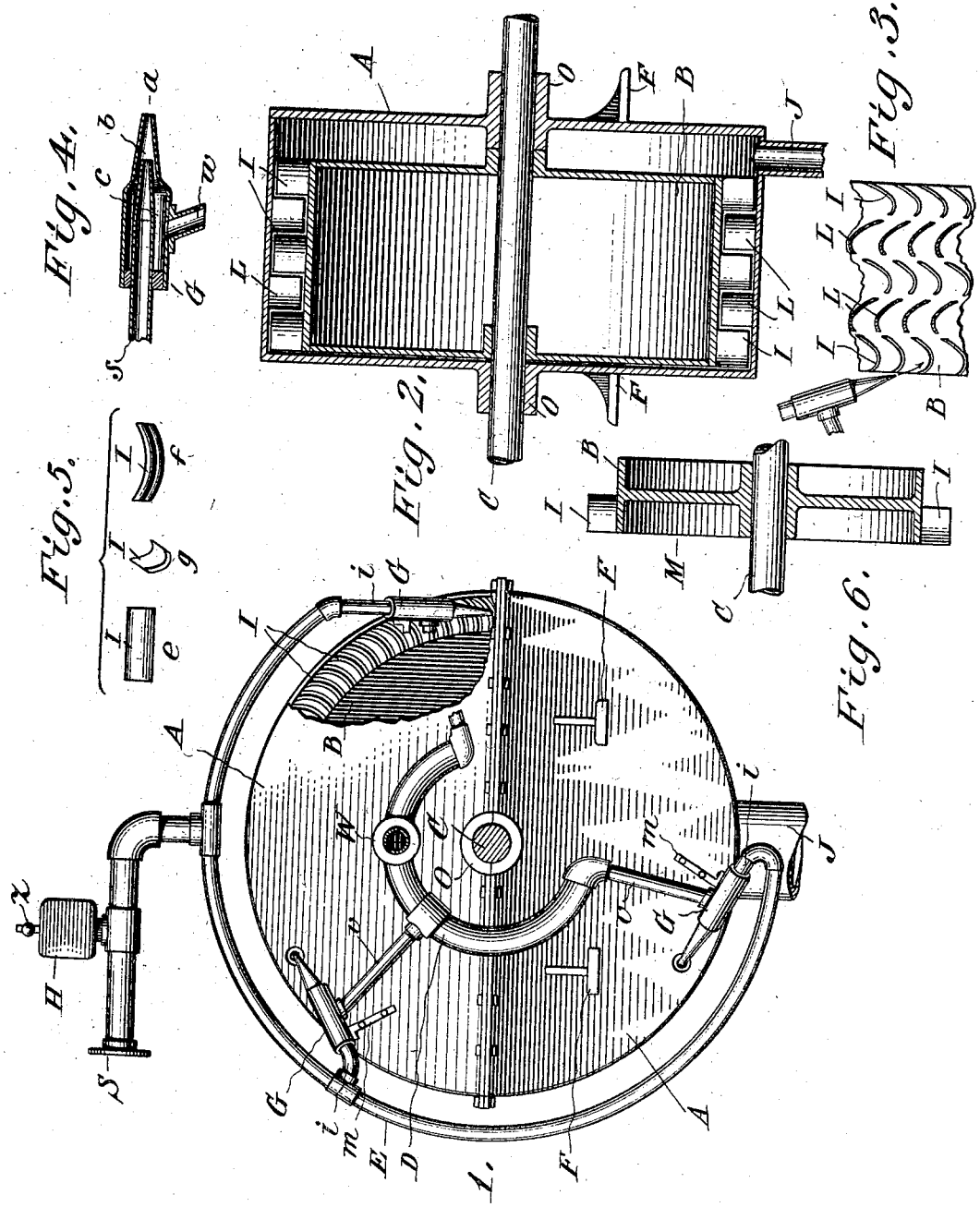

UNITED STATES PATENT OFFICE.

DAVID MACLEAN, OF CALEXICO, CALIFORNIA.

COMPOUND HYDRO-STEAM ENGINE.

991,074.  Specification of Letters Patent.  Patented May 2, 1911.

Application filed September 8, 1910.  Serial No. 581,083.

*To all whom it may concern:*

Be it known that I, DAVID MACLEAN, residing at Calexico, in the county of Imperial and State of California, have invented a new and useful Compound Hydro-Steam Engine, of which the following is a specification.

My invention relates to an improvement in a compound hydro-steam engine, in which a plurality of injectors are arranged in combination with a plurality of series of buckets mounted upon the periphery of a drum in several planes perpendicular to the axle, and a plurality of series of deflectors mounted within a case between the series of buckets, to produce power at a convenient speed.

The object of my improvements are: 1. To provide a rotating drum, wheels or disks, mounted upon an axle, with a plurality of series of buckets affixed to the periphery thereof. 2. A case to contain the drum and support the bearings for the journals of an axle, upon which the drum is mounted. 3. To provide a plurality (two or more) of injectors. 4. To provide manifolds and connections to convey steam and water to the injectors. 5. A trap in the main steam line to separate air and impurities from the steam.

Figure 1 is an elevation view of the entire engine, with part of the case cut away, showing the end of the drum, with attached buckets around the periphery; also showing the position of the injectors, manifolds, steam trap and connections. Fig. 2 is a cross sectional view along the line and parallel with the center line of the shaft, showing the drum and positions of attached buckets; and the case, showing the positions of the attached deflectors, and the bearings and axle. The dotted lines indicate disks or arms that may be used to support a segmental drum upon which the buckets are mounted. Fig. 3 is a view of an injector, buckets and deflectors, showing their relative positions, and the action of the jet of water upon the buckets and deflectors. Fig. 4 is a cross sectional view of an injector, and other allied instruments. Fig. 5 is a detailed view of the buckets, and the deflectors which are of similar design. Fig. 6 is a cross sectional view of a segmental drum.

Similar letters refer to similar parts throughout the several views.

The bearing O Fig. 1, is supported by the enveloping case A, and with the lugs F forms the framework of the engine. G G G are a plurality of injectors attached to the case A by brackets m. These are arranged to discharge the jets in the same relative direction, and are connected by pipes v to the manifold D. The main pipe to convey water from a source of supply is connected at the flange W. The pipes i i i connect the injectors to the manifold E, which in turn is connected to a steam boiler at the flange S. The trap H in the main steam line separates air and impurities from the steam, and discharges them at the pet cock z.

J is a waste pipe to convey the spent water from the engine.

The drum B, Figs. 1 and 2, is mounted upon the axle C, and carries several continuous series of buckets I, upon the periphery. Wheels or disks, as indicated by the dotted lines M, mounted upon the axle C, may be used to support the buckets.

I and L indicate alternate series of buckets and deflectors. The several series of deflectors are affixed within the case or upon concentric rings (not shown) secured within the case, and in a reverse position in relation to the buckets.

A view through the center line of the jet and parallel with the axle, and through the buckets I I I and deflectors L L, with an injector G, is shown in Fig. 3. The injector is placed at about the angle to project the jet of water upon the first series of buckets in the direction of the arrow. The direction of the jet of water at this point is partially reversed by impinging upon the first series of buckets. The next first series of deflectors changes the direction of the jet to about the same angle as the original jet, or in the same direction as the drum rotates. The stream here impinges upon the second series of buckets, and delivers to them a further impulse derived from the momentum of the water, and so continued throughout the several series of buckets and deflectors, until the original velocity of the jet, generated within the injector, is spent.

A cross sectional view of an injector is shown at G, Fig. 4, and illustrates the principle upon which this instrument, and allied instruments, such as jet and exhaust pumps and inspirators are operated. Water from a source of supply is conducted through the pipe w, and steam under pressure is conveyed through the pipe s. The steam is forced through the nozzle of the pipe s causing a partial vacuum in the chamber c, which supplies the water. In the combining tube b the steam and water combine and force the resulting jet through the nozzle a at high velocity.

An enlarged view of the bucket is shown in Fig. 5. e is a top view, f the side view, and g the end view. This view also shows the deflectors L, which are of a similar pattern. The bucket is curved laterally and transversely. The lateral curve is such that the line of the projected jet will be at right angles, at the point of contact, with the tangent of the curve, as the deflectors advance until out of range of the jet. The transverse curve is as shown. These buckets and deflectors are attached to the drum and case with bolts or screws.

A segmental drum is preferred, of which Fig. 6 is a cross sectional view. Each section, or web, of the drum B, upon which the buckets I are mounted, is supported upon the axle C by arms, or disks, M. This arrangement facilitates statical or running balancing. Each section consisting of a series of buckets, with webs and disks, are balanced separately, as secured to the axle.

I am aware that steam and water turbines are in use, and disclaim the use of fluids or vapors other than combined steam and water, and using a plurality of jets of water.

I claim:

1. In a compound hydro-steam engine the combination of several injectors, connected to a steam line, with a plurality of series of curved buckets and deflectors as set forth.

2. In a compound hydro-steam engine, having several injectors connected to a steam line, with buckets and deflectors, in combination with a segmental drum, as set forth.

3. In a compound hydro-steam engine having several injectors connected to a steam line, which project their several jets of water directly upon the first series, of a plurality of series of buckets combined with a segmental drum and a frame within which the several series of deflectors are attached.

DAVID MACLEAN.

Witnesses:
PIERRE J. ANDENEAU,
H. HOLMGREN.

---

Copies of this patent may be obtained for five cents each, by addressing the "Commissioner of Patents, Washington, D. C."